United States Patent
Xu

(10) Patent No.: US 9,124,782 B2
(45) Date of Patent: Sep. 1, 2015

(54) MOVIE TICKET VENDING SYSTEM AND HAND-HELD ELECTRONIC DEVICE AND METHOD THEREOF

(71) Applicants: MiTAC International Corp., Kuei San Township (TW); MiTAC Computer (Shen De) Ltd., Foshan (CN)

(72) Inventor: Wilson Xu, Foshan (CN)

(73) Assignees: MiTAC International Corp., Kuei San Township (TW); MiTAC Computer (Shun De), Ltd., Foshan (CN)

( * ) Notice: Subject to any disclaimer, the term of this patent is extended or adjusted under 35 U.S.C. 154(b) by 362 days.

(21) Appl. No.: 13/754,474

(22) Filed: Jan. 30, 2013

(65) Prior Publication Data

US 2013/0250119 A1 Sep. 26, 2013

(30) Foreign Application Priority Data

Mar. 23, 2012 (CN) .......................... 2012 1 0081687

(51) Int. Cl.

| | |
|---|---|
| *H04N 7/18* | (2006.01) |
| *G01S 19/14* | (2010.01) |
| *G06Q 10/02* | (2012.01) |
| *G01S 5/00* | (2006.01) |
| *G06Q 20/00* | (2012.01) |
| *G06Q 30/06* | (2012.01) |
| *G01C 21/36* | (2006.01) |
| *G01S 19/42* | (2010.01) |

(52) U.S. Cl.
CPC ............ *H04N 7/185* (2013.01); *G01C 21/3623* (2013.01); *G01S 5/0027* (2013.01); *G01S 19/14* (2013.01); *G06Q 10/02* (2013.01); *G06Q 20/00* (2013.01); *G06Q 30/06* (2013.01); *G01S 19/42* (2013.01)

(58) Field of Classification Search
USPC ................ 348/158, 116, 113, 94, 49, 207.99, 348/211.3, 231.6, 33.7, 338; 701/210, 400, 701/467, 408, 460, 500; 707/756, 769, 772; 709/203, 217; 725/60, 148, 152, 153; 235/33, 381, 454, 462.45, 470, 472.01
See application file for complete search history.

(56) References Cited

U.S. PATENT DOCUMENTS

| | | | |
|---|---|---|---|
| 2003/0154170 A1* | 8/2003 | Komai ............................ | 705/75 |
| 2005/0044077 A1* | 2/2005 | Shibata ............................. | 707/6 |
| 2005/0134691 A1* | 6/2005 | Cox ......................... | 348/207.99 |

(Continued)

*Primary Examiner* — Jefferey Harold
*Assistant Examiner* — Mustafizur Rahman
(74) *Attorney, Agent, or Firm* — Wang Law Firm, Inc.; Li K. Wang; Stephen Hsu

(57) ABSTRACT

A movie ticket vending system, a hand-held electronic device and a method thereof. The movie ticket vending system includes a server and a handheld electronic device. A plurality of pieces of picture information and a plurality of pieces of service information are stored in the server. The handheld electronic device comprises a camera module, a transmitting module, a processing module and a positioning navigation module. The camera module captures a poster image. The transmitting module uploads the poster image to the server and the server compares the poster image with the plurality of pieces of picture information. The transmission module receives information corresponding to the poster image. The processing module receives a confirm signal to generate a navigation signal corresponding to the service information received by the transmission module. The GPS module generates a navigation route to guide a user to the cinema showing the corresponding movie.

13 Claims, 5 Drawing Sheets

(56) References Cited

U.S. PATENT DOCUMENTS

| | | | |
|---|---|---|---|
| 2005/0162699 A1* | 7/2005 | Fukunaga et al. | 358/1.18 |
| 2005/0177420 A1* | 8/2005 | Tanahashi | 705/14 |
| 2006/0044401 A1* | 3/2006 | Park | 348/207.99 |
| 2006/0086796 A1* | 4/2006 | Onogi | 235/454 |
| 2006/0095286 A1* | 5/2006 | Kimura | 705/1 |
| 2009/0025040 A1* | 1/2009 | Hagawa et al. | 725/60 |
| 2009/0061945 A1* | 3/2009 | Ma | 455/566 |
| 2009/0117845 A1* | 5/2009 | Rao | 455/3.05 |
| 2010/0211602 A1* | 8/2010 | Menon et al. | 707/772 |
| 2010/0281042 A1* | 11/2010 | Windes et al. | 707/756 |
| 2010/0332132 A1* | 12/2010 | Okude et al. | 701/210 |
| 2011/0137742 A1* | 6/2011 | Parikh | 705/26.1 |
| 2011/0221779 A1* | 9/2011 | Okumura et al. | 345/649 |
| 2011/0238293 A1* | 9/2011 | Lee et al. | 701/201 |
| 2011/0294522 A1* | 12/2011 | Huang et al. | 455/456.3 |
| 2012/0023131 A1* | 1/2012 | Downey et al. | 707/769 |

* cited by examiner

MOVIE TICKET VENDING SYSTEM AND HAND-HELD ELECTRONIC DEVICE AND METHOD THEREOF

CROSS-REFERENCE TO RELATED APPLICATION

This application claims the benefit of China Patent Application No. 201210081687.7, filed on Mar. 23, 2012, in the State Intellectual Property Office of the People's Republic of China, the disclosure of which is incorporated herein in its entirety by reference.

BACKGROUND OF THE INVENTION

1. Field of the Invention

The present invention relates to a movie ticket vending system, a handheld electronic device and a movie ticket vending method, and more particularly to a ticket vending system and a method of using a handheld electronic device with a global positioning system (GPS) function to capture a movie poster image and upload the movie poster image to a server to quickly obtain movie information of a nearby cinema having the movie corresponding to the captured poster image movie.

2. Description of Related Art

In recent years, as science and technology advance, and economic and leisure life becomes diversified, people pay more attention to leisure activities. Particularly, watching movies is an indispensable recreation. Since people nowadays are busy at work and have tremendous pressure, people would take advantages of weekends and holidays to watch movies in order to relax themselves in the daily life, therefore cinemas are crowded with people most of the time.

At present, most movie tickets are sold manually at ticket windows or offices, or bought via voice or Internet booking systems. Consumers buying tickets at the ticket windows have to line up and face a big crowd, and often fail buying the desired movie tickets and waste time.

Furthermore, although the voice or Internet booking system allows consumers to buy movie tickets in advance, it requires a complicated procedure to complete the voice or Internet booking, and takes much time for the booking. In view of this problem, the inventor of the present invention provides a convenient movie ticket vending system for the people.

SUMMARY OF THE INVENTION

In view of the aforementioned problem of the prior art, it is a primary objective of the present invention to provide a movie ticket vending system, a handheld electronic device, and a movie ticket vending method to overcome the problems of having to face a large crowd and line up to buy movie tickets, or fail to buy the movie tickets successfully, or spend to much time on the voice or Internet movie ticket booking.

To achieve the foregoing objective, the present invention provides a movie ticket vending system comprising a server and a handheld electronic device. The server stores a plurality of pieces of picture information and a plurality of pieces of service information, and each piece of picture information corresponds to at least one piece of service information; the handheld electronic device comprises a camera module, a transmission module, a processing module and a GPS module. The camera module captures a poster image; the transmission module uploads the poster image to the server, and after the server compares the poster image with the plurality of pieces of picture information and the poster image matches with one of the plurality of pieces of picture information, the transmission module receives at least one piece of service information corresponding to the poster image; the processing module receives a confirm signal to generate a navigation signal corresponding to at least one piece of service information received by the transmission module; and the GPS module receives the navigation signal to generate at least one navigation route to guide a user to a cinema showing a movie corresponding to the service information.

Further, the movie ticket vending system of the present invention further comprises a plurality of service ends, each corresponding to a cinema, and the service ends transmit the plurality of pieces of picture information and the plurality of pieces of service information to the server.

Further, the plurality of pieces of service information includes a plurality of cinema names, and each cinema's location, fare, seat and screening.

Further, the GPS module further positions the current position of the handheld electronic device to generate a current position information, and the transmission module transmits the current position information to the server, and the server transmits the service information of a cinema near the current position information within a specific range and corresponding to the poster image to the handheld electronic device according to the current position information and the poster image.

Further, the movie ticket vending system of the present invention further comprises an input module for a user to select at least one of the pieces of service information received by the transmission module and confirm the booking, seat, and screening and input a dollar amount to pay for a movie ticket according to the selected service information to complete inputting the confirm signal.

Further, the movie ticket vending system of the present invention further comprises a display module that displays at least one navigation route and at least one of the service information received by the transmission module.

Further, the navigation route includes a traveling distance and a traveling time To achieve the aforementioned objective, the present invention further provides a handheld electronic device selectively connected to a server via a network, and the server stores a plurality of pieces of picture information and a plurality of pieces of service information, and each piece of the picture information corresponds to at least one of the pieces of service information, and the handheld electronic device comprises: a camera module, for capturing a poster image; a transmission module, for uploading the poster image to the server, and after the server compares the poster image with the plurality of pieces of picture information and the poster image matches one of the pieces of picture information, the transmission module receives at least one service information corresponding to the poster image; a processing module, for receiving a confirm signal to generate a navigation signal corresponding to one of the pieces of the service information corresponding to the transmission module; and a GPS module, for receiving the navigation signal to generate at least one navigation route to guide a user to a cinema showing a movie corresponding to the service information.

To achieve the aforementioned objective, the present invention further provides a movie ticket vending method comprising the following steps. Firstly, a poster image is captured by a camera module of a handheld electronic device, and uploaded to a server by a transmission module of the handheld electronic device, and then the server compares the poster image with plural pieces of picture information. The server transmits at least one stored plurality of pieces of the service information to the transmission module if the poster image matches one of the plurality of pieces of picture information. A processing module of the handheld electronic device receives a confirm signal to generate a navigation signal corresponding to at least one of the pieces of service information received by the transmission module. Finally, a GPS module of the handheld electronic device receives the navigation signal to generate at least one navigation route to guide a user to a cinema showing a movie corresponding to the poster image.

In summation, the movie ticket vending system, the handheld electronic device and the movie ticket vending method of the present invention can use the camera module of the handheld electronic device to capture a movie poster image, and upload the movie poster image to a server via a network, and the movie poster image is compared to quickly obtain cinema information corresponding to the captured movie poster image, and a user can confirm a booking, seat, and screening and make payment of a movie ticket online to improve the convenience of buying movie tickets.

The foregoing and other objectives, technical characteristics and advantages of the present invention will become apparent with the detailed description of preferred embodiments accompanied with related drawings as follows.

DETAILED DESCRIPTION OF THE PREFERRED EMBODIMENTS

Figure 1:
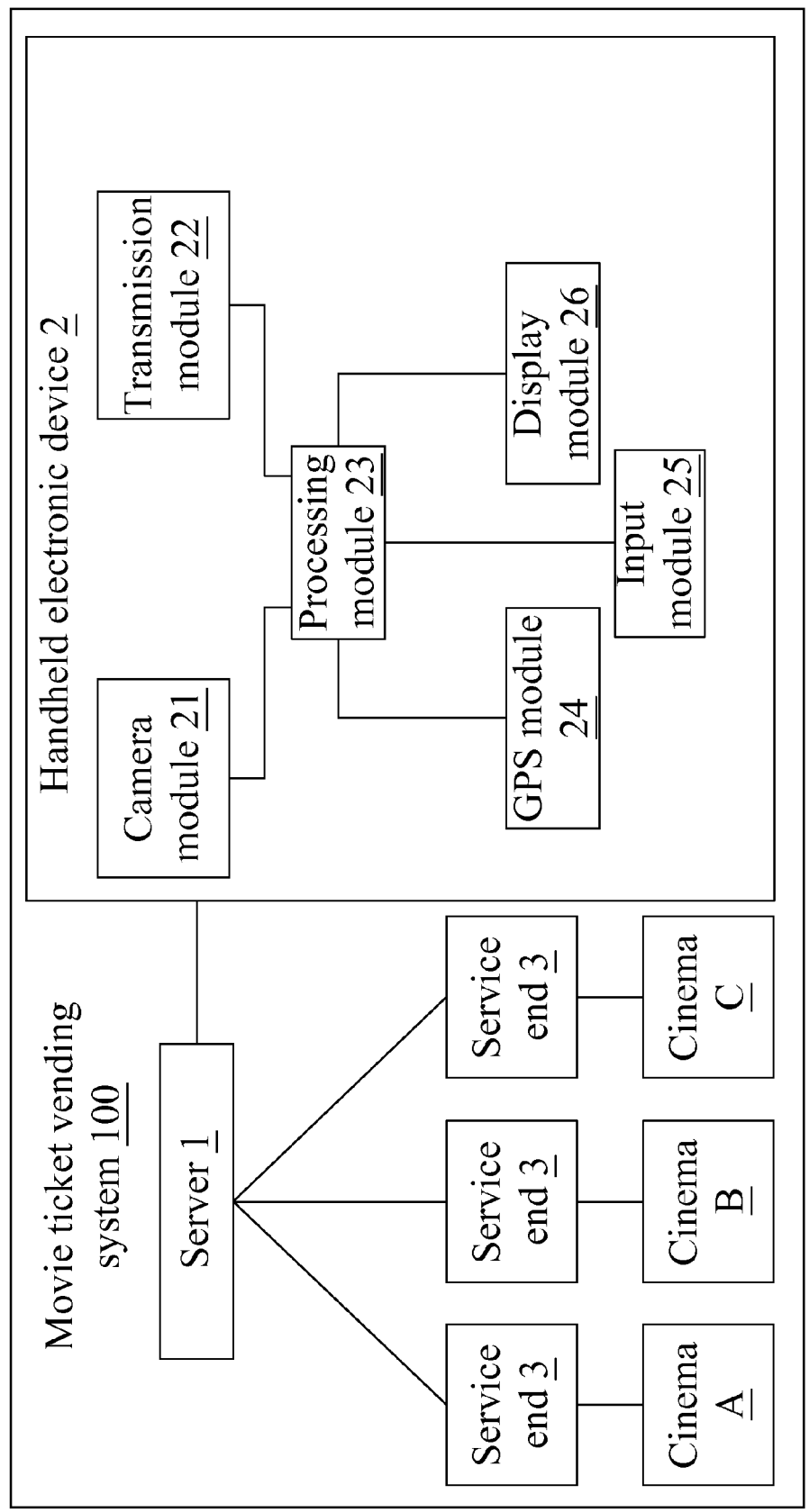
FIG. 1 is a block diagram of a movie ticket vending system and a handheld electronic device of the present invention.

With reference to FIG. 1 for a block diagram of a movie ticket vending system and a handheld electronic device of the present invention, movie ticket vending system 100 comprises a server 1 and a handheld electronic device 2. The server 1 stores a plurality of pieces of picture information and a plurality of pieces of service information, and each piece of picture information corresponds to at least one piece of service information. Wherein, the server 1 is coupled to a plurality of service ends 3, and each service end 3 corresponds to a cinema A, a cinema B or a cinema C, and the server 1 receives the plurality of pieces of picture information and plurality of pieces of service information transmitted from the plurality of service ends 3. Each service end 3 can be a host computer system installed at cinema A, cinema B or cinema C. The server 1 can be a remote computer. The plurality of pieces of picture information includes movie pictures, posters or DVD covers. In addition, the plurality of pieces of service information includes a plurality of cinema names, and the location, fare, seat and screening of each cinema. The handheld electronic device 2 comprises a camera module 21, a transmission module 22, a processing module 23, a GPS module 24, an input module 25 and a display module 26, wherein the processing module 23 is coupled to the camera module 21, the transmission module 22, the GPS module 24, the input module 25 and the display module 26. The camera module 21 can be a camera lens, an image sensor or their combination, and the processing module 23 can be a processing chip, and the input module 25 can be a press button, and the display module 26 can be a screen, and the input module 25 and display module 26 can be integrated as a touch screen. Wherein, the handheld electronic device 2 includes but is not limited to a Smart phone, a flat PC or a personal digital assistant (PDA).

If a user wants to buy a movie ticket at a cinema, the user can capture a poster image by the camera module 21 of the handheld electronic device 2, wherein the poster image can be a movie picture or an advertising poster. The user can upload the poster image to the server 1 through the transmission module 22. If the server 1 compares the poster image with the plurality of pieces of picture information and the poster image matches one of the plurality of pieces of picture information, the transmission module 22 will receive at least one service information corresponding to the poster image from the server 1, and the display module 26 will display at least one piece of service information received by the transmission module 22. In addition, the user can use an input module 25 to select at least one of the pieces of service information received by the transmission module 22, and the user can confirm the booking, seat, and screening and input information to make payment of the movie ticket according to the selected service information, so as to complete inputting the confirm signal. And then, the processing module 23 receives a confirm signal to generate a navigation signal, and the navigation signal corresponds to the user's selected service information. Further, the GPS module 24 receives the navigation signal received by the processing module 23 to generate at least one navigation route and the display module 26 displays at least one navigation route to guide the user to a cinema corresponding to the service information (or corresponding to the poster image). Wherein, the navigation route includes a traveling distance and a traveling time.

The GPS module 24 positions the current position of the handheld electronic device 2 to generate current position information. The transmission module 22 will transmit the current position information and the poster image to the server 1 simultaneously, and the server 1 will transmit a piece of service information of a cinema near the current position information within a specific range and corresponding to the poster image to the handheld electronic device 2 according to the current position information and the poster image.

If the user is not at the cinema, but at home or any other place, the user can download the poster image by the transmission module 22 via the Internet, and then upload the poster image to the server 1 to search the cinema information corresponding to the poster image.

Figure 2:
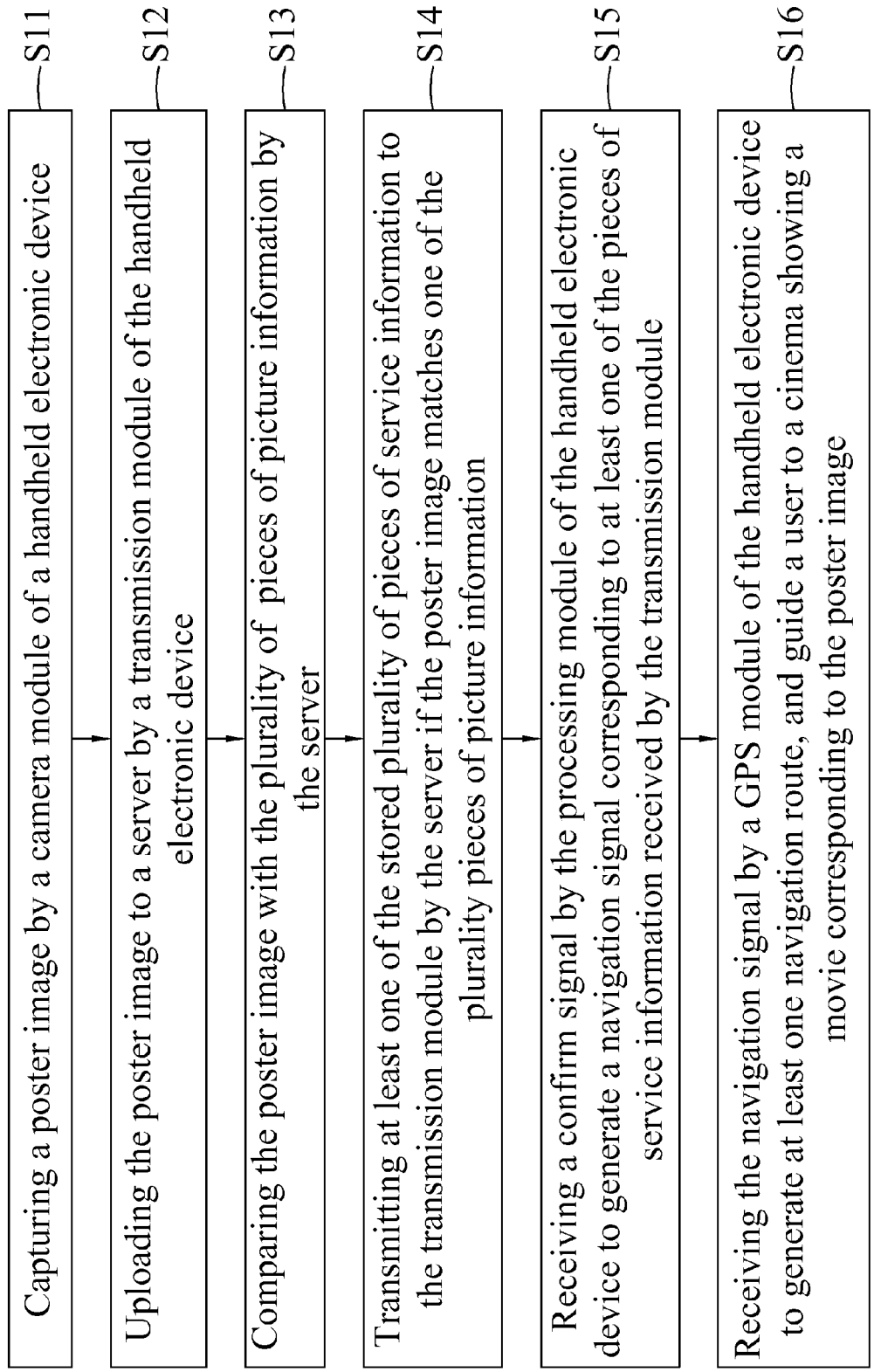
FIG. 2 is a flow chart of a movie ticket vending method of the present invention.

With reference to FIG. 2 for a flow chart of a movie ticket vending method of the present invention, the movie ticket vending method comprises the following steps:

S11: Capturing a poster image by a camera module 21 of a handheld electronic device 2.

S12: Uploading the poster image to a server 1 by a transmission module 22 of the handheld electronic device 2.

S13: Comparing the poster image with the plurality of pieces of picture information by the server 1.

S14: Transmitting at least one of the stored plurality of pieces of service information to the transmission module 22 by the server 1 if the poster image matches one of the plurality of pieces of picture information.

S15: Receiving a confirm signal by the processing module 21 of the handheld electronic device 2 to generate a navigation signal corresponding to one of the at least one piece of service information received by the transmission module 22.

S16: Receiving the navigation signal by a GPS module 24 of the handheld electronic device 2 to generate at least one navigation route, and guide a user to a cinema showing a movie corresponding to the poster image.

The function and operation of the components in each of the aforementioned steps are the same as the contents described in the section of the movie ticket vending system and the handheld electronic device as depicted in FIG. 1, and thus will not be repeated.

Figure 3A:
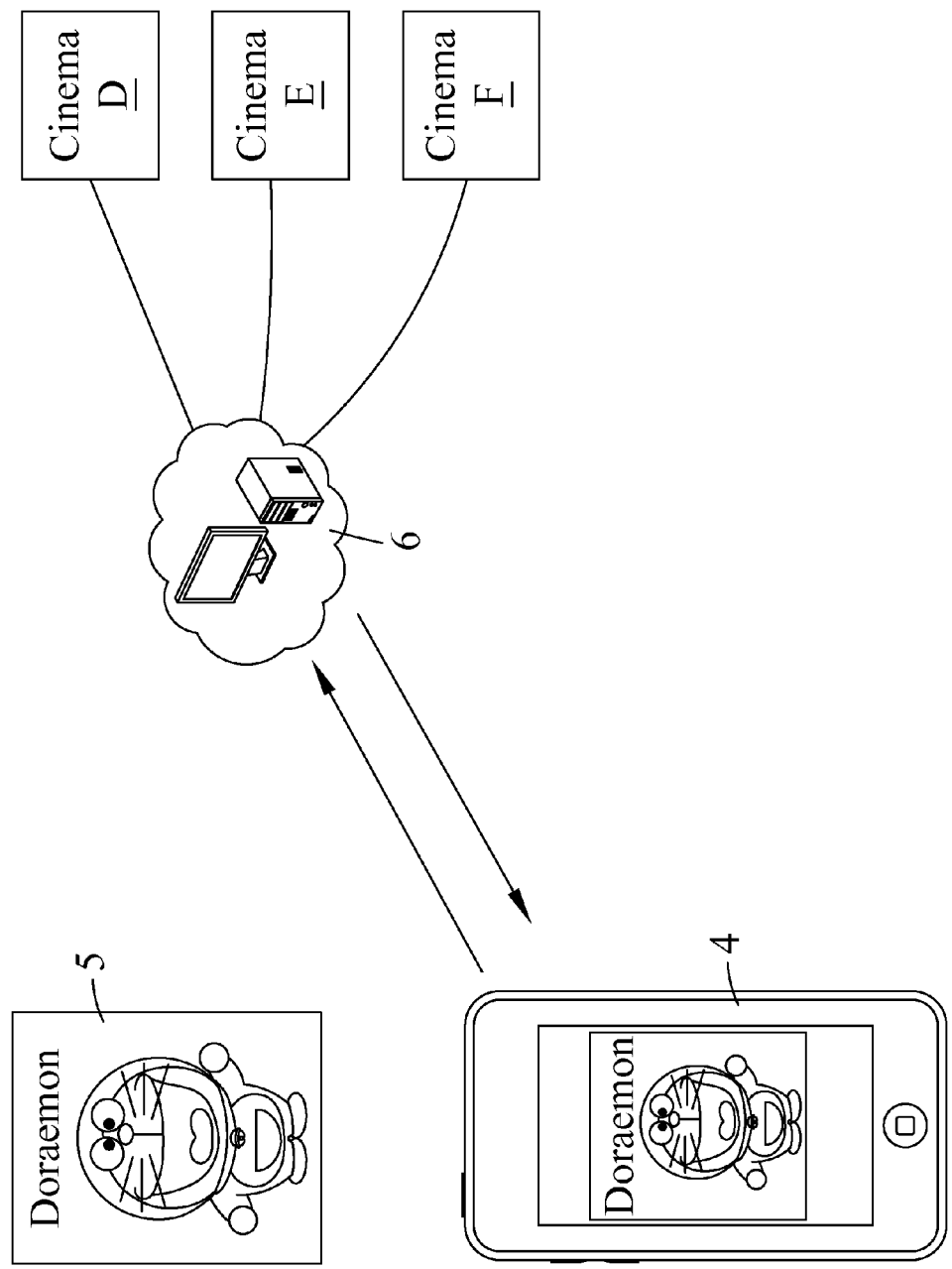
FIG. 3A is a first schematic view of a movie ticket vending system, a handheld electronic device and a movie ticket vending method in accordance with a preferred embodiment of the present invention.
Figure 3B:
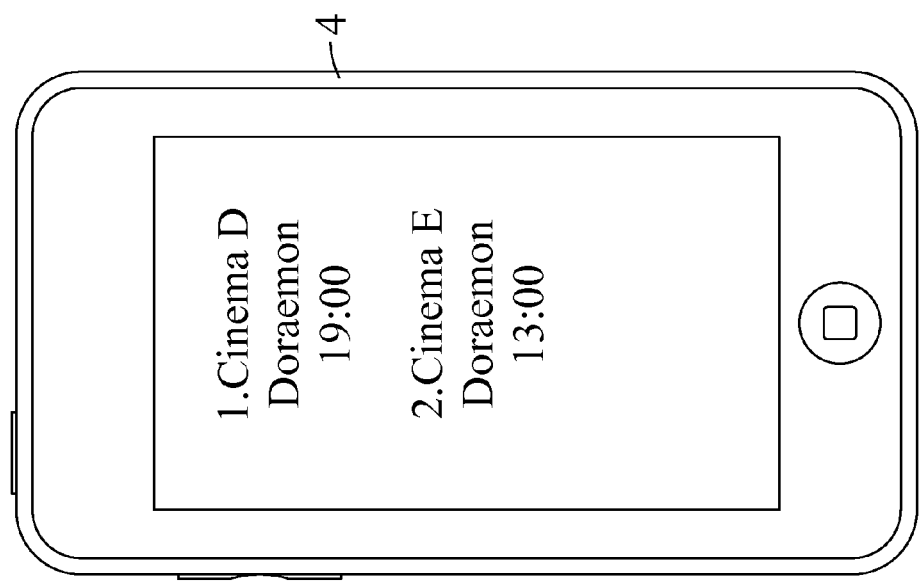
FIG. 3B is a second schematic view of a movie ticket vending system, a handheld electronic device and a movie ticket vending method in accordance with a preferred embodiment of the present invention.
Figure 3C:
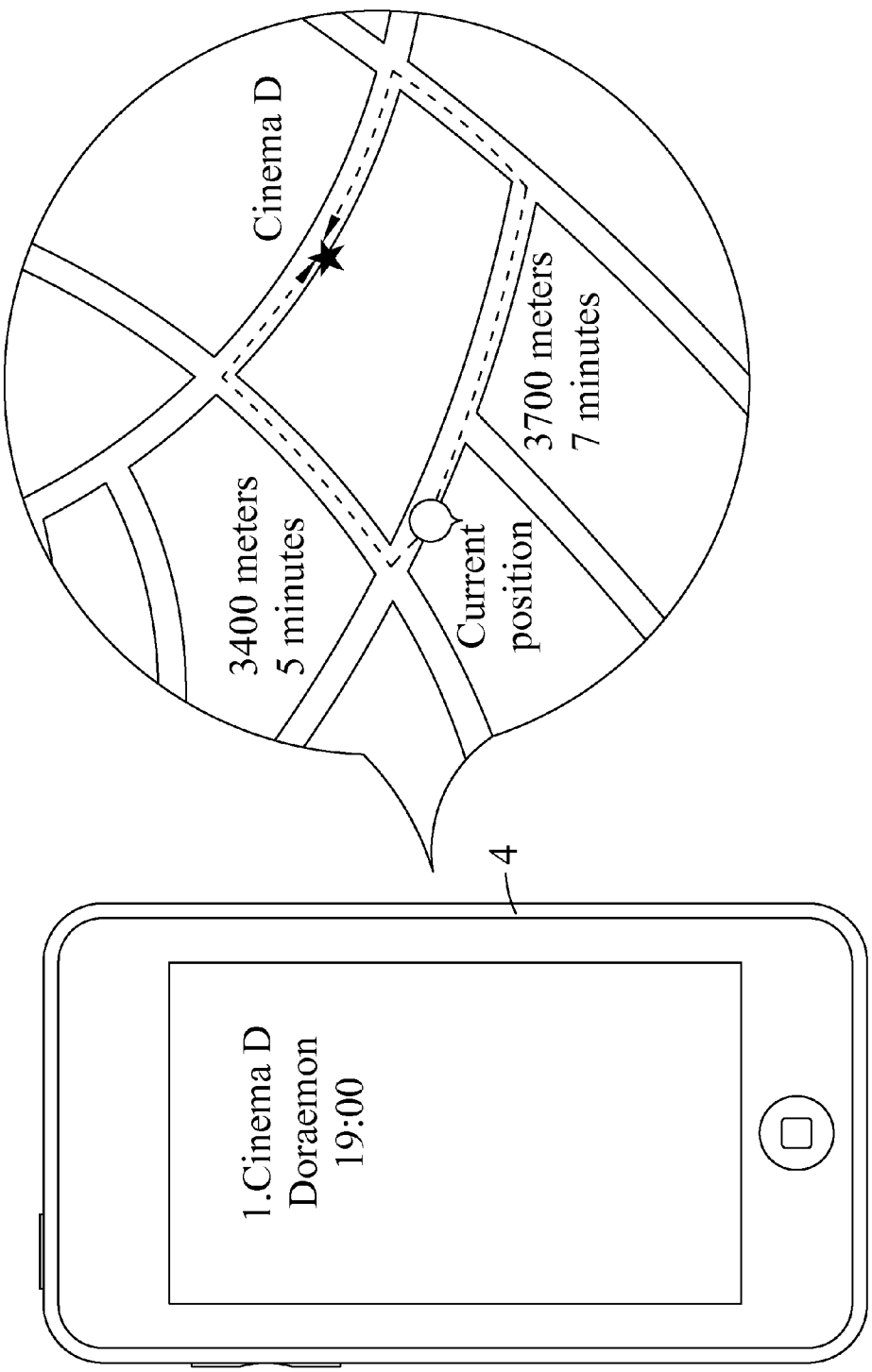
FIG. 3C is a third schematic view of a movie ticket vending system, a handheld electronic device and a movie ticket vending method in accordance with a preferred embodiment of the present invention.

With reference to FIGS. 3A~3C for the first, second and third schematic view of a movie ticket vending system, a handheld electronic device and a movie ticket vending method in accordance with a preferred embodiment of the present invention respectively, this preferred embodiment, if a user wants to buy a movie ticket at a cinema and finds a long line and fails to buy the ticket, the user can use a camera system of a mobile phone 4 to capture a movie picture 5 (which is the poster image of the present invention), and upload the movie picture 5 to a server 6 by a network function of the mobile phone 4. The server 6 will compare the captured movie picture 5 with the plurality of pieces of picture information stored in the server 6 as shown in FIG. 3A. The server 6 can be linked to cinemas D, E and F, and the plurality of pieces of picture information stored in the server 6 are and provided and uploaded by each cinema D, E and F, and each cinema D, E and F can upload the plurality of pieces of service information to the server 6 separately, wherein each piece of picture information corresponds to a piece of service information.

After the server 6 compares the movie picture 5 with the plurality of pieces of picture information, at least one piece of service information corresponding to the movie picture 5 is transmitted to the mobile phone 4 and displayed from a display screen of the mobile phone 4 as shown in FIG. 3B. in the figures, the cinema D and the cinema E have the picture information corresponding to the movie picture 5, so that the display screen of the mobile phone 4 displays that cinema D and cinema E provide service information related to the movie picture 5. Wherein, the service information provided by the cinema D and the cinema E include the name of the cinemas D and E, the name of a movie and the screening corresponding to the movie picture 5 or further include the ticket price and seat of the movie related to the movie picture 5 in the cinemas D and E and the location of the cinemas D and E. In addition, if the user selects one piece of the service information displayed on the mobile phone 4 (or selects the cinema D or cinema E), the mobile phone 4 provides the user to book a movie ticket and select a screening and a seat and make payment of the ticket online. In this embodiment, the user selects the service information provided by the cinema D. Finally, the GPS function of the mobile phone 4 is used to generate at least one navigation route from the current position of the mobile phone 4 to the cinema D as shown in FIG. 3C to guide the user to the cinema D in order to view the movie corresponding to the movie picture 5.

In summation of the description above, the movie ticket vending system, the handheld electronic device, and the movie ticket vending method of the present invention mainly use a handheld electronic device with a GPS function to capture a poster image and upload the poster image to a server to perform a comparison, so that a user can quickly obtain at least one piece of service information of the movie related to the poster image. If the user selects one piece of service information of a movie, the handheld electronic device will generate a navigation route to guide the user to the cinema corresponding to the service information. The invention not only speed up the purchase of movie tickets, but also improves the convenience and guides the users to the destination or cinema quickly through the global positioning system (GPS).

What is claimed is:

1. A movie ticket vending system, comprising:
a server storing a plurality of pieces of picture information and a plurality of pieces of service information, the pieces of picture information each corresponding to at least one of the pieces of service information; and
a handheld electronic device, comprising:
a camera module capturing a poster image;
a transmission module uploading the poster image to the server, and receiving at least one of the pieces of service information corresponding to the poster image when the server compares the poster image with the plurality of pieces of picture information and the poster image matches one of the pieces of picture information;
a processing module receiving a confirm signal to generate a navigation signal corresponding to at least one of the pieces of service information received by the transmission module; and
a GPS module receiving the navigation signal to generate at least one navigation route to guide a user to a cinema showing a movie corresponding to the service information,
wherein the plurality of pieces of service information include a plurality of cinema names, and each cinema's location, fare, seat and screening,
wherein the movie ticket vending system further comprises an input module for the user to select at least one of the pieces of service information received by the transmission module and confirm a booking, seat, and screening and input a dollar amount to pay for a movie ticket according to the selected service information to complete inputting the confirm signal, and
wherein the at least one navigation route includes a traveling distance and a traveling time.

2. The movie ticket vending system of claim 1, further comprising a plurality of service ends, each corresponding to a cinema, and the service ends transmitting the plurality of pieces of picture information and the plurality of pieces of service information to the server.

3. The movie ticket vending system of claim 1, wherein the GPS module further positions a current position of the handheld electronic device to generate a current position information, and the transmission module transmits the current position information to the server, and the server transmits the service information of a cinema near the current position information within a specific range and corresponding to the poster image to the handheld electronic device according to the current position information and the poster image.

4. The movie ticket vending system of claim 1, further comprising an input module for the user to select at least one of the pieces of service information received by the transmission module and confirm a booking, seat, and screening and input a dollar amount to pay for a movie ticket according to the selected service information to complete inputting the confirm signal.

5. The movie ticket vending system of claim 1, further comprising a display module that displays at least one of the navigation routes and at least one piece of the service information received by the transmission module.

6. A handheld electronic device, selectively connected to a server via a network, and the server storing a plurality of pieces of picture information and a plurality of pieces of service information, and each piece of the picture information corresponds to at least one of the pieces of service information, and the handheld electronic device comprising:
   a camera module capturing a poster image;
   a transmission module uploading the poster image to the server, and after the server compares the poster image with the plurality of pieces of picture information and the poster image matches one of the pieces of picture information, the transmission module receives at least one piece of service information corresponding to the poster image;
   a processing module receiving a confirm signal to generate a navigation signal corresponding to one of the pieces of service information corresponding to the transmission module; and
   a GPS module receiving the navigation signal to generate at least one navigation route to guide a user to a cinema showing a movie corresponding to the service information,
   wherein the plurality of pieces of service information include a plurality of cinema names, and each cinema's location, fare, seat and screening,
   wherein the handheld electronic device further comprises an input module that is provided for the user to select at least one piece of service information received by the transmission module and confirm a booking, seat, and screening and input a dollar amount to pay for a movie ticket according to the selected service information to complete inputting the confirm signal, and
   wherein the navigation route includes a traveling distance and a traveling time.

7. The handheld electronic device of claim 6, wherein the server is coupled to a plurality of service ends, each corresponding to a cinema, and the service ends transmits the plurality of pieces of picture information and the plurality of pieces of service information to the server.

8. The handheld electronic device of claim 6, wherein the GPS module positions a current position of the handheld electronic device to generate a current position information, and transmits the current position information to the server through the transmission module, and the server transmits the service information of a cinema showing a movie corresponding to the poster image and near the current position information within a specific range to the handheld electronic device according to the current position information and the poster image.

9. The handheld electronic device of claim 6, further comprising a display module for displaying at least one of the navigation routes and at least one of the pieces of service information received by the transmission module.

10. A movie ticket vending method, comprising the steps of:
   capturing a poster image by a camera module of a handheld electronic device;
   uploading the poster image to a server by a transmission module of the handheld electronic device;
   comparing the poster image with a plurality of pieces of picture information by the server;
   transmitting at least one stored plurality of pieces of service information to the transmission module by the server if the poster image matches one of the plurality of pieces of picture information;
   receiving a confirm signal by a processing module of the handheld electronic device to generate a navigation signal corresponding to at least one of the pieces of service information received by the transmission module; and
   receiving the navigation signal to generate at least one navigation route by a GPS module of the handheld electronic device to guide a user to a cinema showing a movie corresponding to the poster image,
   wherein the plurality of pieces of service information include a plurality of cinema names, and each cinema's location, fare, seat and screening,
   wherein the movie ticket vending method further comprises providing an input module of the handheld electronic device to a user to select at least one of the pieces of the service information received by the transmission module and confirm a booking, seat, and screening and input a dollar amount to pay for the movie ticket according to the selected service information to complete inputting the confirm signal, and wherein the navigation route includes a traveling distance and a traveling time.

11. The movie ticket vending method of claim 10, further comprising the steps of:
   providing a plurality of service ends coupled to the server and each service end corresponding to a cinema; and
   transmitting the plurality of pieces of picture information and the plurality of pieces of service information to the server from the service ends.

12. The movie ticket vending method of claim 10, further comprising the steps of:
   positioning a current position of the handheld electronic device to generate a current position information by the GPS module;
   transmitting the current position information to the server by the transmission module; and
   transmitting the service information of a cinema near the current position information within a specific range and corresponding to the poster image by the handheld electronic device according to the current position information and the poster image by the server.

13. The movie ticket vending method of claim 10, further comprising the step of displaying at least one of the navigation routes and at least one of the service information received by the transmission module through a display module of the handheld electronic device.

* * * * *